(12) United States Patent
Hu et al.

(10) Patent No.: US 12,313,780 B2
(45) Date of Patent: May 27, 2025

(54) PRISM AND MULTI-BEAM LIDAR SYSTEM

(71) Applicant: Leishen Intelligent System Co., Ltd., Guangdong (CN)

(72) Inventors: Xiaobo Hu, Guangdong (CN); Fang Bai, Guangdong (CN)

(73) Assignee: Leishen Intelligent System Co., Ltd., Shenzhen (CN)

( * ) Notice: Subject to any disclaimer, the term of this patent is extended or adjusted under 35 U.S.C. 154(b) by 976 days.

(21) Appl. No.: 17/384,799

(22) Filed: Jul. 25, 2021

(65) Prior Publication Data

US 2021/0349187 A1 Nov. 11, 2021

Related U.S. Application Data

(63) Continuation of application No. PCT/CN2020/078715, filed on Mar. 11, 2020.

(30) Foreign Application Priority Data

Mar. 19, 2019 (CN) .......................... 201910208364.1

(51) Int. Cl.
*G01S 7/00* (2006.01)
*G01S 7/481* (2006.01)
*G02B 5/04* (2006.01)
*G01S 17/06* (2006.01)

(52) U.S. Cl.
CPC .......... *G01S 7/4813* (2013.01); *G01S 7/4817* (2013.01); *G02B 5/04* (2013.01); *G01S 17/06* (2013.01)

(58) Field of Classification Search
USPC ...................................................... 356/4.01
See application file for complete search history.

(56) References Cited

U.S. PATENT DOCUMENTS

2018/0067195 A1 3/2018 Slobodyanyuk et al.

FOREIGN PATENT DOCUMENTS

| CN | 103038568 A | 4/2013 | |
| CN | 207318710 U | 5/2018 | |
| CN | 108398696 A | 8/2018 | |
| CN | 108490419 A | 9/2018 | |
| DE | 10141363 A1 | 3/2003 | |
| EP | 1421404 A2 * | 5/2004 | .......... G01S 7/4817 |
| EP | 2631667 A1 | 8/2013 | |
| KR | 20160062043 A * | 9/2017 | ............. G02B 5/045 |
| WO | WO-03019226 A2 * | 3/2003 | .......... G01S 7/4817 |

OTHER PUBLICATIONS

International Search Report of PCT Patent Application No. PCT/CN2020/078715 issued on Jun. 4, 2020.
The Extended European Search Report of EP application No. 20773363.5 issued on Oct. 25, 2022.

* cited by examiner

Primary Examiner — James R Hulka

(57) ABSTRACT

A prism for a multi-beam lidar includes a top surface, a bottom surface, and at least three side surfaces positioned between the top surface and the bottom surface, at least two of the at least three side surfaces each include an emission region and a receiving region; the receiving region is positioned between the emission region and the top surface; in a direction from the top surface to the bottom surface, the emission region includes at least two reflecting surfaces positioned successively, and included angles between the at least two reflecting surfaces and the bottom surface are different from each other.

20 Claims, 6 Drawing Sheets

PRISM AND MULTI-BEAM LIDAR SYSTEM

CROSS-REFERENCE TO RELATED APPLICATIONS

The present disclosure is a continuation of International Application No. PCT/CN2020/078715, filed on Mar. 11, 2020, which claims priority of Chinese Patent Application No. 201910208364.1, filed on Mar. 19, 2019, titled "PRISM AND MULTI-BEAM LIDAR SYSTEM", the contents of which are incorporated herein by reference.

TECHNICAL FIELD

The present disclosure relates to lidar technologies, and particularly to a prism and a multi-beam lidar system.

BACKGROUND

With the development of laser technologies, laser scanning technologies are increasingly used in a variety of fields such as measurement, transportation, driving assistance, and mobile robots. Lidar is a radar system that detects the position, velocity, and other characteristics of a target by laser. The working principle of a lidar is to first emit a laser beam to a target, and then compare a received signal reflected from the target with the emitted signal. After proper processing of the comparison results, the distance, orientation, height, velocity, attitude, even shape and other information of the target can be obtained.

At present, the most commonly used lidar includes a single-beam lidar optical system and a multi-beam lidar optical system. The single-beam lidar applies a single beam to scan, and the scanning area is small; the multi-beam lidar is rotated by a motor to scan the surrounding environment, and focuses the returned light from the irradiated object on a corresponding photoelectric sensor through a long focal large target receiving optical system, which can emit and receive multiple arrays of light beams, and scan a certain area of the surrounding environment. However, the multi-beam lidar needs too many laser emitters, the receiver needs a large photosensitive surface to receive the laser beam reflected from the target object, and the processing circuit is complex and costly.

SUMMARY

According to the embodiments of the present disclosure, a prism and a multi-beam lidar system are provided.

In a first aspect, an embodiment of the present disclosure provides a prism for a multi-beam lidar, comprising:

a top surface;

a bottom surface; and at least three side surfaces positioned between the top surface and the bottom surface; at least two of the at least three side surfaces each comprising an emission region and a receiving region; the receiving region positioned between the emission region and the top surface;

in a direction from the top surface to the bottom surface, the emission region comprising at least two reflecting surfaces positioned successively, and included angles between the at least two reflecting surfaces and the bottom surface being different from each other.

In a second aspect, an embodiment of the present disclosure provides a multi-beam lidar system, comprising:

a prism, comprising a top surface, a bottom surface, and at least three side surfaces positioned between the top surface and the bottom surface; at least two of the at least three side surfaces each comprising an emission region and a receiving region; the receiving region positioned between the emission region and the top surface; in a direction from the top surface to the bottom surface, the emission region comprising at least two reflecting surfaces positioned successively, and included angles between the at least two reflecting surfaces and the bottom surface being different from each other;

a rotating mechanism, the prism positioned on the rotating mechanism, the rotating mechanism configured to drive the prism to rotate around a rotating axis of the rotating mechanism; and at least one group of transceiver module comprising a transmitting unit and a receiving unit; the transmitting unit positioned at one side of the prism and configured to emit a laser beam, the laser beam emitted from the transmitting unit being reflected through the emission region of the prism to irradiate a target object; the receiving unit and the transmitting unit of one group of transceiver module positioned on the same side of the prism, the receiving unit configured to receive the laser beam first reflected from the target object and then reflected through the receiving region of the prism.

Details of one or more embodiments of the present disclosure are provided in the drawings and descriptions below. Other features and advantages of the present disclosure will become apparent from the specification, drawings and claims.

BRIEF DESCRIPTION OF THE DRAWINGS

To describe the embodiments of the present disclosure or the technical solutions in the related art more clearly, the following will give a brief introduction to the drawings associated with the embodiments of the present disclosure or the related art. It is obvious that the drawings in the following description are only intended to illustrate some embodiments of the present disclosure. For those skilled in the art, some deformations can be obtained according to these drawings without any creative work.

DETAILED DESCRIPTION

Figure 1:
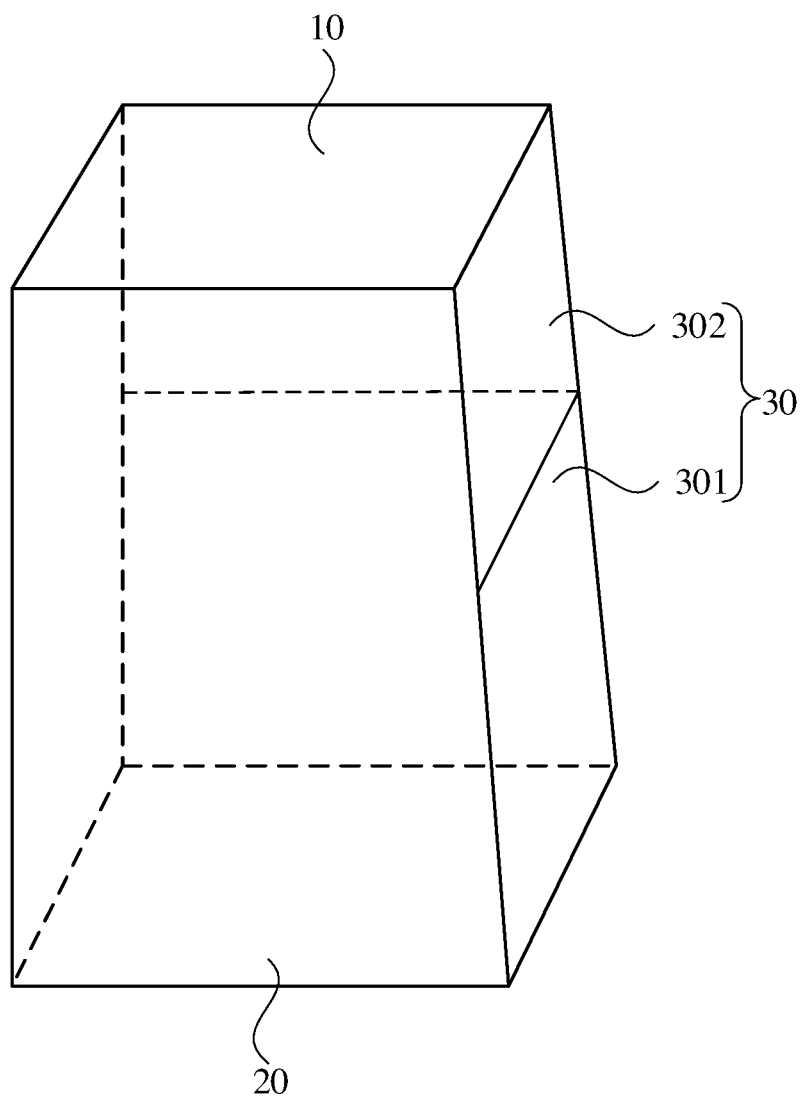
FIG. 1 is a schematic diagram of a prism in accordance with an embodiment of the present disclosure.

The technical solutions in the embodiments of the present disclosure will be described clearly below with reference to the drawings and the embodiments of the present disclosure. It should be understood that, the described embodiments are only intended to interpret the present disclosure, and are not to limit the present disclosure. In addition, it should be noted that for the convenience of description, only some but not all structures related to the present disclosure are shown in the drawings.

The terms used in the embodiments of the present disclosure are for the purpose of describing specific embodiments only and are not intended to limit the present disclosure. The direction words "up", "down", "left" and "right" in this disclosure are all based on the angle shown in the figure, and should not be understood as limiting the embodiments of the disclosure. In addition, in the context, when it is mentioned that an element is formed "up" or "down" on another element, it can not only be directly formed "up" or "down" on another element, but also indirectly formed "up" or "down" on another element through intermediate elements. The terms "first", "second" and so on are used for descriptive purposes only, and do not mean any order, quantity or importance, but only to distinguish different components. For those skilled in the art, the specific meaning of the above terms in the present disclosure can be understood in specific circumstances.

Figure 2:
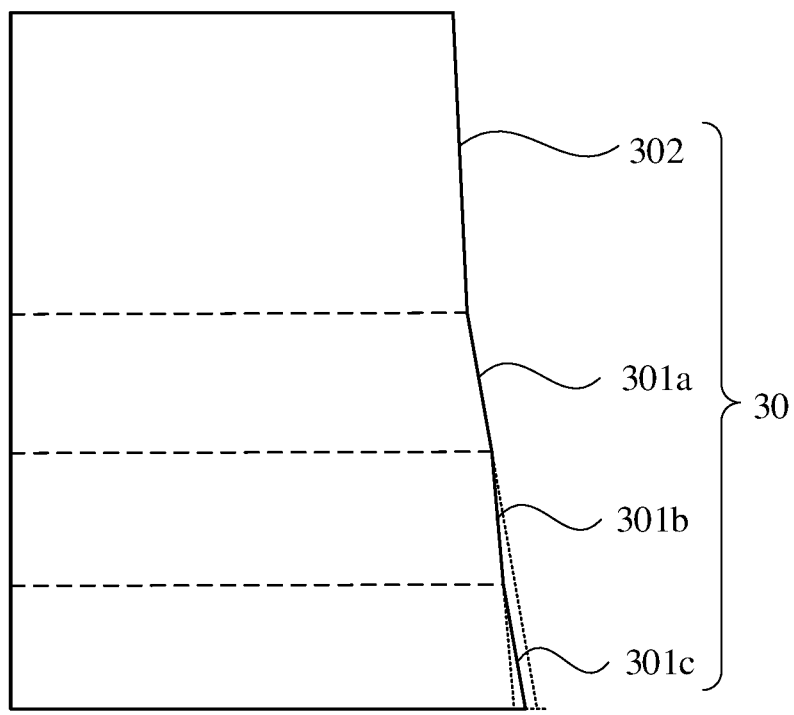
FIG. 2 is a front view of the prism in FIG. 1.

FIG. 1 is a schematic diagram of a prism in accordance with an embodiment of the present disclosure, and FIG. 2 is a front view of the prism in FIG. 1. The prism of the embodiment of the present disclosure is applicable to a multi-beam lidar system. Referring to FIG. 1, the prism includes a top surface 10, a bottom surface 20, and at least three side surfaces 30 between the top surface 10 and the bottom surface 20; at least two of the at least three side surfaces 30 each include an emission region 301 and a receiving region 302; the receiving region 302 is positioned between the emission region 301 and the top surface 10; and in the direction from the top surface 10 to the bottom surface 20, the emission region 301 includes at least two reflecting surfaces positioned successively, and the included angles between the at least two reflecting surfaces and the bottom surface 20 are different from each other.

It should be noted that the shape of the prism shown in FIG. 1 is a quadrangular prism, which is only illustrative and not limited in the present disclosure; in actual implementation, the number of the side surfaces 30 can be set as needed. At least two side surfaces 30 between the top surface 10 and the bottom surface 20 are defined as reflecting surfaces, for example, the rear side surface and the right side surface in FIG. 1. The reflecting surfaces can be formed by coating a reflecting film on the side surfaces. As an example, FIG. 2 is a front view of FIG. 1, showing the shape of the right side surface. As shown in FIG. 2, the right side surface includes the receiving region 302 in the upper part and the emission region 301 in the lower part. The emission region 301 includes at least two reflecting surfaces (in FIG. 2, as an example, three reflecting surfaces 301a, 301b and 301c are shown), and the included angles between the at least two reflecting surfaces and the bottom surface 20 are different from each other. For example, in FIG. 2, the included angle between the reflecting surface 301a and the bottom surface is the same as the included angle between the reflecting surface 301c and the bottom surface 20; the included angle between the reflecting surface 301a and the bottom surface is different from the included angle between the reflecting surface 301b and the bottom surface 20. It can be understood that when each side surface is regarded as a whole, the included angles between at least two side surfaces and the bottom surface are different from each other. It should be noted that the short dotted line on the right side in FIG. 2 is to show the included angle between each reflecting surface and the bottom surface, not the actual contour of the prism.

It can be understood that when the laser beam emitted by a laser is transmitted to the emission region of the prism, because the included angles between different reflecting surfaces and the bottom surface are different from each other, different reflected beams will be formed in the vertical direction of space (perpendicular to the top surface and bottom surface); when the prism rotates, the beams can scan the target object, for example, the prism including four side surfaces in FIG. 1. If all four side surfaces are defined as the reflecting surfaces, and the emission region of each side surface includes three reflecting surfaces, the distance of the reflected light in the vertical direction can be adjusted by adjusting the inclination angle of the three reflecting surfaces (for example, dense in the middle part and sparse on both sides). When the prism rotates for one circle, the laser beams emitted by a row of lasers can form four scanning beams with different resolutions; when used in a lidar, a four-beam multi-resolution scanning can be realized through a row of lasers, which greatly reduces the complexity and cost of the multi-beam lidar.

Figure 3:
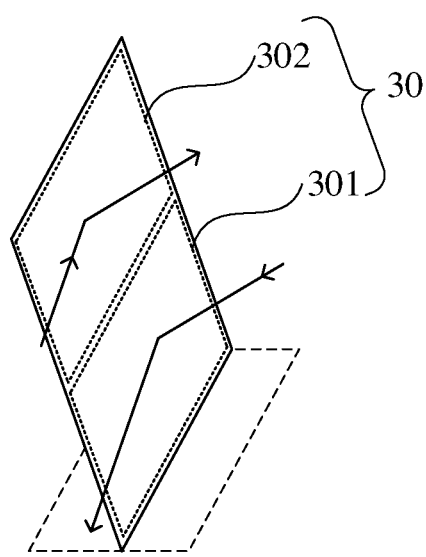
FIG. 3 is a schematic diagram of a reflection light path of a side surface of a prism in accordance with an embodiment of the present disclosure.

FIG. 3 is a schematic diagram of a reflection light path of a side surface of a prism in accordance with an embodiment of the present disclosure. Referring to FIG. 3, the upper part is the receiving region 302, and the lower part is the emission region 301. For purpose of description, only the receiving region 302 and the reflecting surface of the emission region 301 closest to the receiving region 302 are shown in FIG. 3. The emission region 301 reflects the laser beam incident from the right side (from the light source) to the left side, and the propagation direction of the laser beam reflected from the emission region 301 is from right to left. The receiving region 302 reflects the laser beam (reflected from the target object) incident from the right side to the right side, and the propagation direction of the laser beam reflected from the receiving region 302 is from left to right. The side surface of the prism includes the receiving region, such that the reflected beam from the target object can be reflected and converged on the receiver, which can effectively reduce the requirements of the field of view angle of the receiving lens, reduce the area of the photosensitive surface of the receiver, and reduce the cost of the multi-beam lidar system.

In the technical scheme of the embodiment, at least two side surfaces of the prism are defined as the reflecting surfaces with different inclination angles, such that the light beams irradiating on different reflecting surfaces become multiple beams when the prism rotates, and the scanning resolution of the reflected light can be changed by setting different variation trends of the inclination angles of the reflecting surfaces on the same side surface; when the prism is used in the lidar and rotated, the multi-beam scanning can be realized, which can reduce the number of transmitters and receivers. By setting the emission region and the receiving region, such that the emission region can reflect the laser beam to a target object, and the receiving region can receive the laser beam reflected by the target object and reflect the laser beam to the receiver. Because one side surface includes both the emission region and the receiving region, the laser beam reflected from the emission region of the side surface to the target object can be received by the receiving region of the side surface after being reflected by the target object, and then reflected to the receiver. Therefore, there is no need to prepare a special receiver with a large photosensitive surface to receive the laser beam reflected by the target object, thereby reducing the production cost and difficulty of the multi-beam lidar system.

On the basis of the above technical schemes, optionally, in the direction from the top surface to the bottom surface, the included angles between the at least two reflecting surfaces in one emission region and the bottom surface are distributed in an arithmetic progression.

Figure 4:
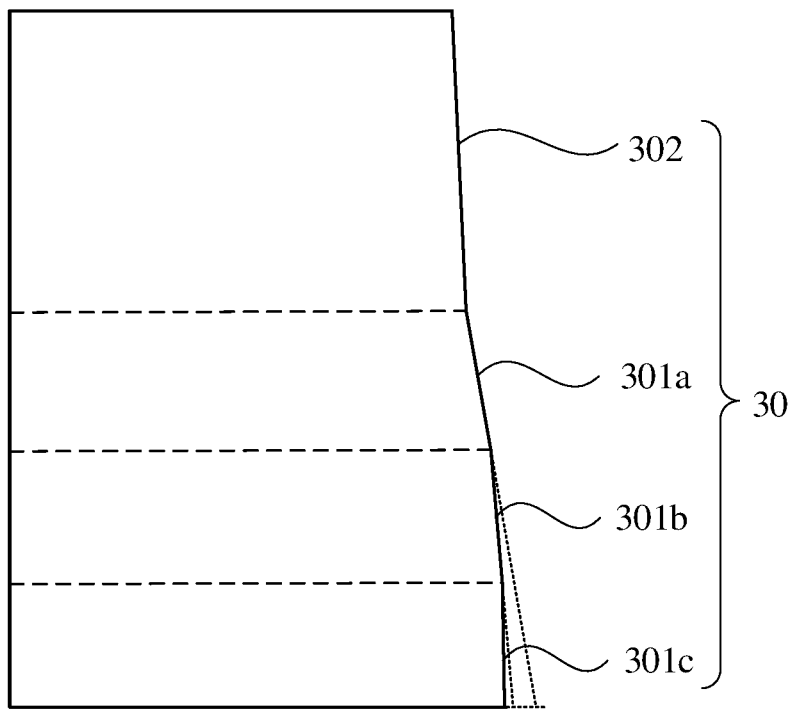
FIG. 4 is another front view of the prism in FIG. 1.

As an exemplary embodiment, FIG. 4 is another front view of the prism in FIG. 1. As shown in FIG. 4, along the direction from top to bottom, the included angles between the reflecting surfaces of the emission region 301 and the bottom surface are distributed in an arithmetic progression, that is, the included angles between the reflecting surfaces and the bottom surface present in a gradient distribution, for example, from top to bottom, the included angles between the reflecting surfaces 301a, 301b and 301c and the bottom surface are 88°, 88.5°, and 89°, respectively, or 89°, 88.5°, and 88°, respectively (not shown in FIG. 4). In this way, the reflected lights of the reflecting surfaces can be evenly distributed in the vertical direction, thus achieving the spatial equal resolution scanning.

Optionally, each side surface includes at least four reflecting surfaces; in one emission region, the difference of the included angles between two neighboring reflecting surfaces close to the middle of the emission region and the bottom surface is the smallest.

Figure 5:
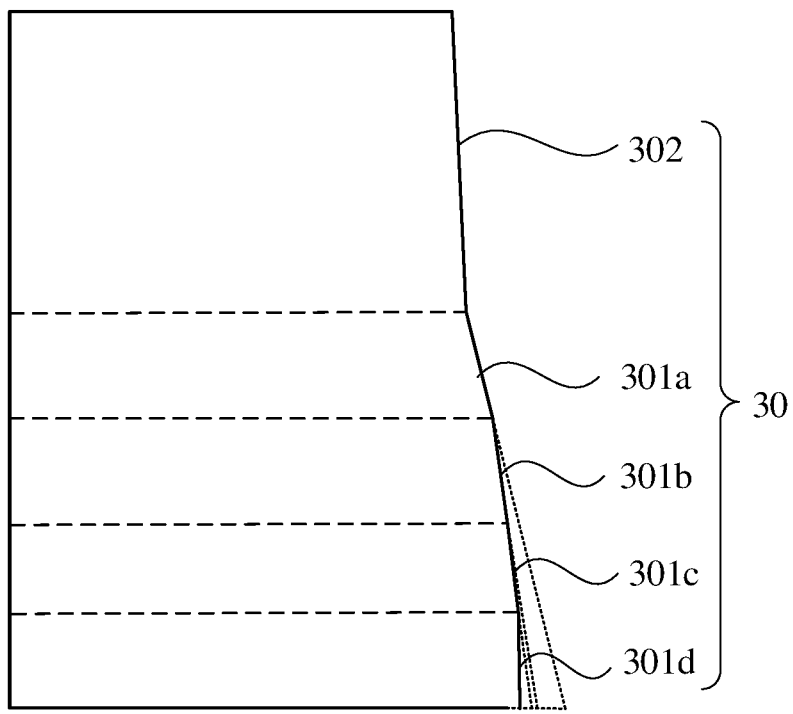
FIG. 5 is still another front view of the prism in FIG. 1.

As an exemplary embodiment, FIG. 5 is still another front view of the prism in FIG. 1. As shown in FIG. 5, from top to bottom, the differences of the included angles between the reflecting surfaces of the emission region and the bottom surface increase from the middle to both sides. For example, from top to bottom, the included angles between the reflecting surfaces 301a, 301b, 301c and 301d and the bottom surface are 88°, 88.4°, 88.6°, 89°, respectively, or 89°, 88.60, 88.40, 88°, respectively. In this way, the reflected light of the reflecting surface in the middle is closer (high resolution) thus achieving longer detection distance, while the reflected lights of the reflecting surfaces on both sides are farther (low resolution), thus achieving shorter detection distance. It can be understood that when the number of the reflecting surfaces is odd, the differences of the included angle between the middlemost reflecting surface and the bottom surface and the included angles between the two reflecting surfaces adjacent to the middlemost reflecting surface and the bottom surface are equal, and both are the minimum.

It should be noted that the above exemplary embodiments of the number of the reflecting surfaces in the emission region and the sizes of the included angles are only illustrative; the included angle between each reflecting surface of one emission region and the bottom surface can be set as needed, and the included angles between the reflecting surfaces of different side surfaces corresponding to each other in position and the bottom surface can be the same or different, and the embodiments of the present disclosure are not limited to these.

Optionally, the included angle between the side surface including the receiving region and the bottom surface is $\alpha 1$; the included angle between a reflecting surface of the emission region and the bottom surface is $\alpha 2$; and $\alpha 1=\alpha 2$. Optionally, in one side surface and in the direction from the top surface to the bottom surface, the included angle between the receiving region and the bottom surface and the included angles between the reflecting surfaces of the emission region and the bottom surface are distributed in an arithmetic progression.

As an exemplary embodiment, continuing to refer to FIG. 4, the included angle between the receiving region 302 and the bottom surface and the included angles between the reflecting surfaces of the emission region and the bottom surface are in gradient distribution, for example, the included angle between the receiving region 302 and the bottom surface is 87.5°, or the included angle between the receiving region 302 and the bottom surface is equal to the included angle between any one of the reflecting surfaces and the bottom surface (for example, 88°, 88.5°, or 89°), or different from each other. In other embodiments, the included angle between the receiving region and the bottom surface can be designed according to the angle of the reflected light.

Optionally, the maximum included angle between the reflecting surface and the bottom surface is $\alpha 3$; the minimum included angle between the reflecting surface and the bottom surface is $\alpha 4$; and $0°<|\alpha_3-\alpha_4|<2°$.

It can be understood that the advantages of the embodiments are: all the reflecting surfaces will not tilt too much, such that the multi-beam radar system has good resolution. It should be noted that in other embodiments, the difference between $\alpha 3$ and $\alpha 4$ can be greater than or equal to 2°.

Optionally, the prism includes n pairs of opposite side surfaces, and N is a positive integer greater than or equal to 2. In two opposite side surfaces, the included angles between the reflecting surfaces closest to the bottom surface and the bottom surface are greater than or less than the included angle between the reflecting surface of at least one side surface between the two opposite side surfaces closest to the bottom surface and the bottom surface.

Figure 6:
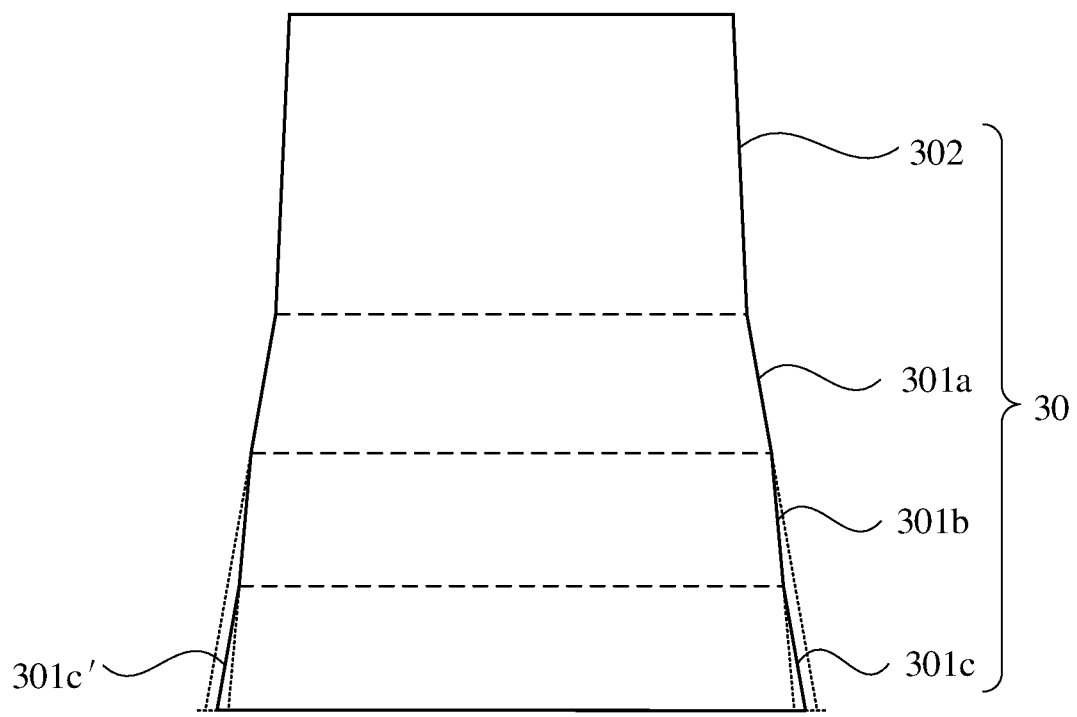
FIG. 6 is still yet another front view of the prism in FIG. 1.

As an exemplary embodiment, FIG. 6 is still yet another front view of the prism in FIG. 1. Referring to FIG. 6, suppose n=2, the included angles between the downmost reflecting surface 301c' of the left side surface and the downmost reflecting surface 301c of the right side surface and the bottom surface are both greater than or less than the included angle between the downmost reflecting surface of at least one of the front side surface and the rear side surface and the bottom surface. For example, the included angle between the reflecting surfaces 301c' and the bottom surface is 89°, the included angle between the reflecting surfaces 301c and the bottom surface is 88°, and the included angle between the downmost reflecting surface of the front side surface and the bottom surface is 87°. In this way, the included angles between the reflecting surfaces and the bottom surface will not gradually increase or decrease around the prism, thus avoiding the serious uneven torque of multiple reflecting surfaces of the prism, which is conducive to achieving the torque balance of multiple reflecting surfaces when the prism is rotated.

Optionally, in the two opposite side surfaces, the included angles between the reflecting surfaces closest to the bottom surface and the bottom surface are equal.

It can be understood that in the two opposite side surfaces, the included angles between the reflecting surfaces closest to the bottom surface and the bottom surface are equal, such that the two opposite reflecting surfaces have the same inclination degree. When the prism is rotated, no uneven torque is produced in the two opposite reflecting surfaces, thus achieving the torque balance of the multiple reflecting surfaces of the prism.

In one embodiment, the emission region of one side surface of the prism 100 includes a plurality of reflecting surfaces; at least two reflecting surfaces are positioned in sequence around the central axis of the prism (that is, the rotation axis of the prism), that is, around the direction from the top surface to the bottom surface. As for the plurality of reflecting surfaces in the emission region of one side surface, the included angle between the reflecting surface in the middle of the emission region and the bottom surface are greater than the included angles between the reflecting surfaces on two sides of the emission region and the bottom surface, such that the laser beam, after passing through the reflecting surfaces, can form a reflection beam dense in the middle and sparse on both sides. In other words, the vertical resolution in the middle is smaller (that is, the vertical resolution angle is smaller) and the detection distance is longer, while the vertical resolution on both sides is relatively greater and the detection distance is shorter. In other embodiments, the design can be arranged in an inverse way, that is, the included angles between the reflecting surfaces on both sides and the bottom surface are greater than the included angle between the reflecting surface in the middle and the bottom surface, so as to form the effect of sparse distribution of the reflection beam in the middle and dense distribution of the reflection beam on both sides. In another embodiment, the included angles between the reflecting surfaces on both sides and the bottom surface are equal to each other, and the included angles between the reflecting surfaces in the middle and the bottom surface are also equal to each other; optionally, the included angles between the plurality of reflecting surfaces and the bottom surface are different from each other.

Referring to FIG. 2, in this embodiment, the emission region 301 on one side surface of the prism includes three reflecting surfaces 301a, 301b and 301c; the included angles between the reflecting surfaces 301a and 301c on both sides and the bottom surface 20 are the same, which are both smaller than the included angle between the reflecting surface 301b and the bottom surface 20.

In one embodiment, the emission regions of other side surfaces of the prism each include only one reflecting surface, that is, the reflecting surface is not divided. In other embodiments, the emission regions of at least two side surfaces of the prism each include a plurality of reflecting surfaces. The emission regions in the side surfaces are of the same structure, and the two side surfaces with the same structure can be set symmetrically about the central axis of the prism.

In another embodiment, the emission region of each side surface of the prism includes a plurality of reflecting surfaces, that is, the emission region of the prism is divided into a plurality of layers. Referring to FIG. 5 as an example, the reflecting surface 301a is located in the first layer, the reflecting surface 301b is located in the second layer, the reflecting surface 301c is located in the third layer, and the reflecting surface 301d is located in the fourth layer, that is, the reflecting surfaces at the same horizontal plane belongs to the same layer. In such a case, the included angles between the reflecting surfaces on the same layer of the side surfaces of the prism and the bottom surface can be the same, or not exactly the same, or not the same, to maximize the number of the light beam of the lidar. Optionally, the included angle between any specific one of the reflecting surfaces on one horizontal layer and the bottom surface is greater or less than the included angle between two reflecting surfaces adjacent to the specific reflecting surface and the bottom surface, thus avoiding the serious uneven torque of multiple reflecting surfaces of the prism, which is conducive to achieving the torque balance of multiple reflecting surfaces when the prism rotates.

Figure 7:
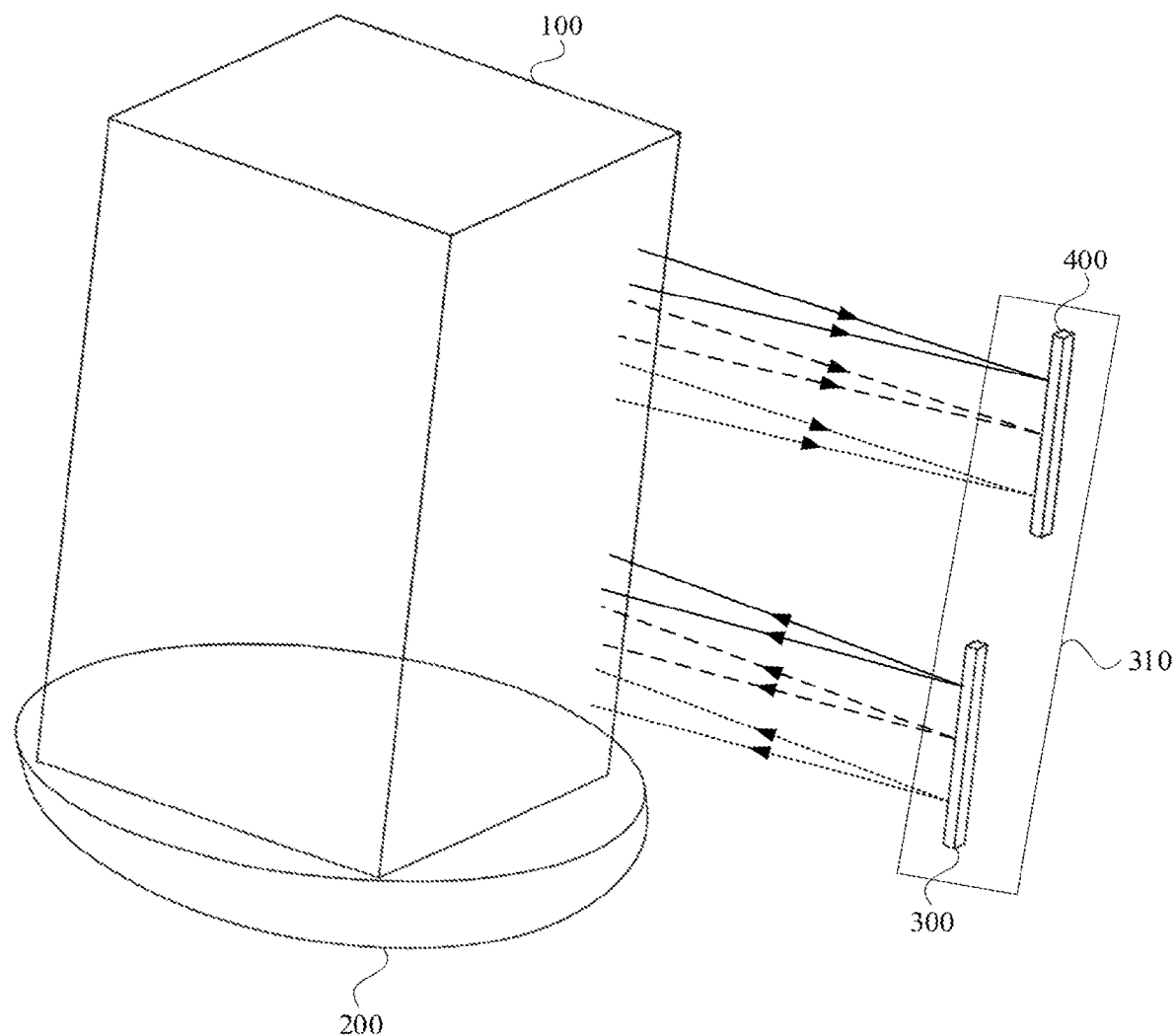
FIG. 7 is a schematic diagram of a multi-beam lidar system in accordance with an embodiment of the present disclosure.

FIG. 7 is a schematic diagram of a multi-beam lidar system in accordance with an embodiment of the present disclosure. The multi-beam lidar system includes the aforesaid prism 100, further includes a rotating mechanism 200, the prism 100 being positioned on the rotating mechanism 200, and the rotating mechanism 200 being configured to drive the prism 100 to rotate around the rotating axis of the rotating mechanism 200; at least one group of transceiver module 310, each group of transceiver module 310 including a transmitting unit 300 and a receiving unit 400; the transmitting unit 300 is positioned at one side of the prism 100 and is configured to emit a laser beam which is reflected through the emission region of the prism 100 to irradiate a target object; the receiving unit 400 and the transmitting unit 300 of one group of transceiver module 310 are positioned on the same side of the prism 100, and the receiving unit 400 is configured to receive the laser beam first reflected from the target object and then reflected through the receiving region of the prism 100.

It can be understood that the rotating mechanism 200 may include a stepping motor, and the rotation axis of the rotating mechanism 200 coincides with the rotation axis of the prism 100; FIG. 7 takes one group of transceiver module 310 as an example; when a plurality of groups of transceiver modules 310 are employed, each group of transceiver module corresponds to one side surface of the prism 100. The transmitting unit 300 may include a pulsed laser for emitting a pulsed light beam; the receiving unit 400 may include a photoelectrical converter configured to convert an optical signal into an electrical signal, and then the distance, shape and other information of the target object can be obtained by processing the electrical signal.

In the technical scheme of the embodiment, at least two side surfaces are defined as reflecting surfaces with different inclination angles, such that the light beams irradiating on different reflecting surfaces form multiple beams when the prism rotates; the inclination angles of the reflecting surfaces on one side surface vary differently, such that the scanning resolution of the reflected light can be changed; When the rotating mechanism drives the prism to rotate, multi-beam scanning is realized, thus saving the number of the transmitting unit and the receiving unit. The side surface of the prism is provided with the emission region and the receiving region, the emission region can reflect the laser beam to the target object, and the receiving region can receive the laser beam reflected by the target object and further reflect the laser beam to the receiver. Because each side surface includes the emission region and the receiving region, the laser beam reflected from the emission region of the side surface to the target object can be received by the receiving region of the side surface after being reflected by the target object, and then reflected to the receiver, therefore, there is no need to prepare a special receiver with a large photosensitive surface to receive the laser beam reflected by the target object, thereby reducing the manufacture cost and difficulty of the multi-beam lidar system. In addition, the rotating mechanism is configured to drive the prism to rotate instead of rotating the whole machine to scan in a horizontal direction, which improves the mechanical performance (seismic resistance, anti-impact, and heat dissipation, etc.) of the product, and the whole radar does not need wireless power transmission and big data wireless transmission, thus simplifying the system structure.

Figure 8:
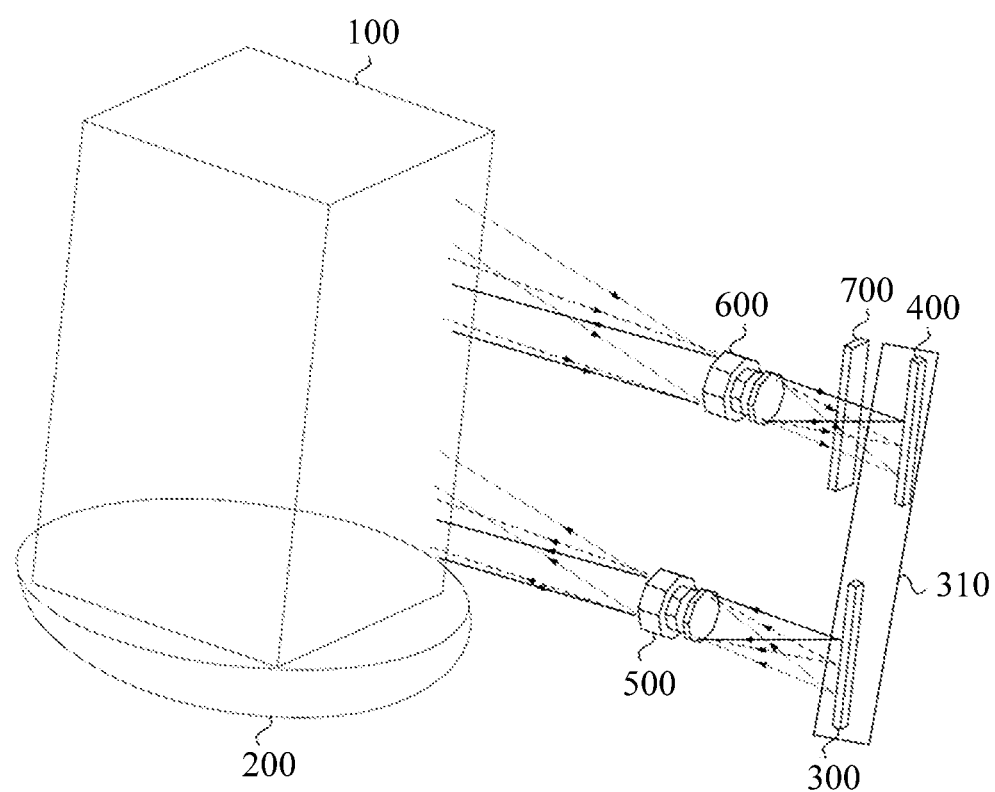
FIG. 8 is a schematic diagram of a multi-beam lidar system in accordance with another embodiment of the present disclosure.

On the basis of the above embodiment, optionally, FIG. 8 is a schematic diagram of a multi-beam lidar system in accordance with another embodiment of the present disclosure. Referring to FIG. 8, the multi-beam lidar system of the embodiment further includes a transmitting lens assembly 500 positioned between the transmitting unit 300 and the prism 100 and configured to collimate the laser beam emitted by the transmitting unit 300 to irradiate the emission region of the prism 100; and a receiving lens assembly 600 positioned between the receiving unit 400 and the prism 100 and configured to focus the laser beam reflected from the receiving region of the prism 100 to irradiate the receiving unit 400.

It can be understood that the transmitting lens assembly 500 and the receiving lens assembly 600 can employ the same type of lens group, which can be designed according to the actual optical path in implementation, and the embodiments of the present disclosure has no limitation on this.

Optionally, the transmitting unit includes laser light sources, the receiving unit includes photoelectrical converters, and a number of the laser light sources is the same as a number of the photoelectrical converters.

It can be understood that in actual implementation, the transmitting unit can employ a semiconductor laser to emit a laser pulse, and the receiving unit can employ a photoelectrical converter formed by the avalanche diode (APD). In other embodiments, the transmitting unit can also employ a fiber laser, a semiconductor laser, a solid-state laser, a gas laser tube and the like. The receiving unit can also employ a PIN photodiode or a silicon photomultiplier tube, etc. To further improve the accuracy of lidar, a plurality of lasers and photoelectrical converters can be employed. The plurality of lasers and photoelectrical converters can be arranged in one column or in multiple columns, and the number and arrangement of the lasers and photoelectrical converters are the same.

Optionally, continuing to refer to FIG. 8, the lidar system further includes a filter lens 700 positioned between the receiving lens assembly 600 and the receiving unit 400 for filtering ambient light.

It can be understood that ambient light such as sunlight and lamplight in the environment may interfere in the signal received by the receiving unit 400. When the system is provided with the filter lens 700, the ambient light can be filtered out, thus improving the measurement accuracy of the multi-beam lidar system.

Optionally, the multi-beam lidar system of the embodiment of the present disclosure further includes a 16 channel transresistance amplifier (not shown in FIG. 8) electrically connected to the receiving unit and configured to amplify and convert a photocurrent signal output by the receiving unit into a voltage signal, thus improving the measurement accuracy.

It should be noted that the above description is only the preferred embodiment and the technical principle disclosure. Those skilled in the art will understand that the present disclosure is not limited to the specific embodiments described herein, and various obvious changes, readjustments and substitutions can be made for those skilled in the art without departing from the protection scope of the present disclosure. Therefore, although the present disclosure has been described in detail through the above embodiments, the present disclosure is not limited to the above embodiments. Without departing from the concept of the present disclosure, it can also include more other equivalent embodiments, and the scope of the present disclosure is determined by the scope of the appended claims.

What is claimed is:

1. A prism for a multi-beam lidar, comprising:
   a top surface;
   a bottom surface; and
   at least three side surfaces positioned between the top surface and the bottom surface; at least two of the at least three side surfaces each comprising an emission region and a receiving region; the receiving region positioned between the emission region and the top surface; in a direction from the top surface to the bottom surface, the emission region comprising at least two reflecting surfaces positioned successively, and included angles between the at least two reflecting surfaces and the bottom surface being different from each other.

2. The prism of claim 1, wherein in the direction from the top surface to the bottom surface, the included angles between the at least two reflecting surfaces in one emission region and the bottom surface are distributed in an arithmetic progression.

3. The prism of claim 1, wherein each side surface comprises at least four reflecting surfaces;
   in one emission region, a difference of the included angles between two neighboring reflecting surfaces adjacent to the middle of the emission region and the bottom surface is the smallest.

4. The prism of claim 1, wherein an included angle between a side surface comprising the receiving region and the bottom surface is $\alpha_1$; an included angle between one reflecting surface of the emission region and the bottom surface is $\alpha_2$; and $\alpha_1=\alpha_2$.

5. The prism of claim 1, wherein a maximum included angle between a reflecting surface and the bottom surface is $\alpha_3$, a minimum included angle between a reflecting surface and the bottom surface is $\alpha_4$, and $0°<|\alpha_3-\alpha_4|<2°$.

6. The prism of claim 2, wherein in one side surface and in the direction from the top surface to the bottom surface, an included angle between the receiving region and the bottom surface and the included angles between the at least two reflecting surfaces in one emission region and the bottom surface are distributed in an arithmetic progression.

7. The prism of claim 1, wherein the prism comprises n pairs of opposite side surfaces, and N is a positive integer greater than or equal to 2;
   in two opposite side surfaces, the included angles between the reflecting surfaces closest to the bottom surface and the bottom surface are greater than or less than an included angle between the reflecting surface of at least one side surface between the two opposite side surfaces closest to the bottom surface and the bottom surface.

8. The prism of claim 7, wherein in the two opposite side surfaces, the included angles between the reflecting surfaces closest to the bottom surface and the bottom surface are equal.

9. The prism of claim 1, wherein the emission region of at least one side surface comprises a plurality of reflecting surfaces, and the included angle between the reflecting surface in the middle of the emission region and the bottom surface is greater than the included angles between the reflecting surfaces at two sides of the emission region and the bottom surface.

10. The prism of claim 9, wherein in the emission region of the at least one side surface, the included angles between the reflecting surfaces at two sides of the emission region and the bottom surface are equal.

11. The prism of claim 1, wherein at least two side surfaces have the same structure and are oppositely positioned on the prism.

12. The prism of claim 1, wherein the emission region of each side surface comprises at least two reflecting surfaces positioned successively, and the included angles between the reflecting surfaces in the same horizontal plane and the bottom surface are not exactly equal to each other.

13. The prism of claim 12, wherein the included angle between any specific one of the reflecting surfaces in the same horizontal plane and the bottom surface is greater or less than the included angles between two reflecting surfaces adjacent to the specific reflecting surface and the bottom surface.

14. A multi-beam lidar system, comprising:
a prism, comprising a top surface, a bottom surface, and at least three side surfaces positioned between the top surface and the bottom surface; at least two of the at least three side surfaces each comprising an emission region and a receiving region; the receiving region positioned between the emission region and the top surface; in a direction from the top surface to the bottom surface, the emission region comprising at least two reflecting surfaces positioned successively, and included angles between the at least two reflecting surfaces and the bottom surface being different from each other;
a rotating mechanism, the prism positioned on the rotating mechanism, the rotating mechanism configured to drive the prism to rotate around a rotating axis of the rotating mechanism; and
at least one group of transceiver module comprising a transmitting unit and a receiving unit; the transmitting unit positioned at one side of the prism and configured to emit a laser beam, the laser beam emitted from the transmitting unit being reflected through the emission region of the prism to irradiate a target object; the receiving unit and the transmitting unit of one group of transceiver module positioned on the same side of the prism, the receiving unit configured to receive the laser beam first reflected from the target object and then reflected through the receiving region of the prism.

15. The multi-beam lidar system of claim 14, wherein in the direction from the top surface to the bottom surface, the included angles between the at least two reflecting surfaces in one emission region and the bottom surface are distributed in an arithmetic progression.

16. The multi-beam lidar system of claim 14, wherein each side surface comprises at least four reflecting surfaces; in one emission region, a difference of the included angles between two neighboring reflecting surfaces adjacent to the middle of the emission region and the bottom surface is the smallest.

17. The multi-beam lidar system of claim 14, wherein an included angle between a side surface comprising the receiving region and the bottom surface is $\alpha_1$, an included angle between a reflecting surface of the emission region and the bottom surface is $\alpha_2$, and $\alpha_1 = \alpha_2$.

18. The multi-beam lidar system of claim 14, wherein a maximum included angle between a reflecting surface and the bottom surface is $\alpha_3$, a minimum included angle between a reflecting surface and the bottom surface is $\alpha_4$, and $0° < |\alpha_3 - \alpha_4| < 2°$.

19. The multi-beam lidar system of claim 14, wherein the prism comprises n pairs of opposite side surfaces, and N is a positive integer greater than or equal to 2;
in two opposite side surfaces, the included angles between the reflecting surfaces closest to the bottom surface and the bottom surface are greater than or less than an included angle between the reflecting surface of at least one side surface between the two opposite side surfaces closest to the bottom surface and the bottom surface.

20. The multi-beam lidar system of claim 14, wherein the emission region of at least one side surface comprises a plurality of reflecting surfaces, and the included angle between the reflecting surface in the middle of the emission region and the bottom surface is greater than the included angles between the reflecting surfaces at two sides of the emission region and the bottom surface.

* * * * *